United States Patent [19]
Carhart et al.

[11] Patent Number: 5,511,186
[45] Date of Patent: Apr. 23, 1996

[54] SYSTEM AND METHODS FOR PERFORMING MULTI-SOURCE SEARCHES OVER HETEROGENEOUS DATABASES

[75] Inventors: Raymond E. Carhart, Sunnyvale; David L. Grier, Castro Valley; Anthony J. Schaller, Alameda, all of Calif.

[73] Assignee: MDL Information Systems, Inc., San Leandro, Calif.

[21] Appl. No.: 978,016

[22] Filed: Nov. 18, 1992

[51] Int. Cl.$^6$ ................................................ G06F 15/00
[52] U.S. Cl. .......................... 395/600; 364/DIG. 1; 364/222.82; 364/222.9; 364/225.4
[58] Field of Search .................. 395/600; 364/DIG. 1

[56] References Cited

U.S. PATENT DOCUMENTS

| | | | |
|---|---|---|---|
| 4,774,655 | 9/1988 | Kollin et al. | 364/200 |
| 4,805,099 | 2/1989 | Huber | 364/300 |
| 4,870,568 | 9/1989 | Kahle et al. | 364/200 |
| 4,881,166 | 11/1989 | Thompson et al. | 364/200 |
| 4,967,341 | 10/1990 | Yamamoto et al. | 364/200 |
| 5,058,000 | 10/1991 | Cox et al. | 364/200 |
| 5,175,814 | 12/1992 | Anick et al. | 395/161 |
| 5,257,366 | 10/1993 | Adair et al. | 395/600 |
| 5,278,978 | 1/1994 | Demers et al. | 395/600 |
| 5,321,833 | 6/1994 | Chang et al. | 395/600 |

*Primary Examiner*—Thomas C. Black
*Assistant Examiner*—Jean R. Homere

[57] ABSTRACT

System and methods for performing search and retrieval operations over multiple databases, the system and methods being suitable for use in combination with databases of different kinds managed by different database management systems, the system and methods also being suitable for use in combination with databases resident on different computers in a computer network environment. The system and methods in their simplest application search each of a pair of database segments incrementally, using the incremental results of one search to direct the processing of the other search. The methods may be nested, and the system may be used in multiple instances, to effect searches on combinations of any number of database segments.

19 Claims, 7 Drawing Sheets

CMPD:

| NAME | TOX | CORP_ID |
|---|---|---|
| alpha | 100 | X1 |
| beta | 200 | X2 |
| gamma | 300 | X3 |
| delta | 1000 | X4 |

INV:

| CORP_ID | BOTTLE_ID | AMOUNT |
|---|---|---|
| X2 | B1 | 10 |
| X2 | B2 | 20 |
| X3 | B3 | 10 |
| X4 | B4 | 15 |

XOUT:

| CHEMIST | CHECKOUT | BOTTLE_ID | CHECKIN |
|---|---|---|---|
| Chen | 11/6/92 | B1 | 11/9/92 |
| Chen | 11/6/92 | B2 | null |
| Chen | 11/11/92 | B4 | null |
| ... | | | |

SYSTEM AND METHODS FOR PERFORMING MULTI-SOURCE SEARCHES OVER HETEROGENEOUS DATABASES

This application includes as Appendix A a microfiche appendix titled Appendix A—Microfiche of Source Code for Flat-File Gateway, having 3 fiche with a total of 253 frames.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to systems and methods useful for performing searches in multi-database systems, and more particularly to methods for performing searches useful in a multi-database system that links together heterogeneous databases through their native database management systems.

BACKGROUND OF THE INVENTION

The database management system has become an important category of computer software based system. Database management systems are available for all kinds of computers and computer systems, from single-user personal computers and workstations to multi-user, distributed mainframe systems. Among the purposes and benefits of a database management system is that it gives users access to data in a data-independent way, facilitates the collection and organization of data in databases, and provides tools allowing a user readily to create, update, modify and delete such databases. In a database management system, the databases themselves are collections of physical data that are stored with relative permanence in a machine-readable way.

Perhaps the most important class of database management system, both theoretically and commercially, is the relational database management system. In a relational database management system, the user sees the data as a collection of tables, each table being seen as a set of rows organized into columns. Each row may be thought of as a record, and each column, as a field in a record. (The term "field" may be used to refer either to a column as a whole, or to a particular row-and-column position.)

An important characteristic of a relational table is whether it is "normalized". In a properly normalized table, that is, in a table that is in at least first normal form, each row has unique identifying values in one or more fields, which fields are known as the primary key. Commercial products, however, will not necessarily enforce this limitation and may allow tables to be created that have duplicate rows. A more important characteristic of normalized tables is that they have an atomic value or a NULL (indicating "no value") in every field of the table. That is, normalized tables do not have other tables as field values. A table that does have (or is permitted to have) tables as field values is said to be in non-first normal form ("NFNF" or "$NF^2$"). This extension to the relational model will be considered in more detail below.

Although commercial products will deviate from the strict relational model, many commercial products are available from a variety of vendors that we may consider to be relational database management systems, including DB2 from International Business Machines Corporation of Armonk, N.Y. (DB2, DB2I and IBM are registered trademarks of International Business Machines Corporation ("IBM")); Ingres from ASK Computer Systems, Inc. of Mountain View, Calif. (Ingres is a registered trademark of ASK Corporation); and Oracle from Oracle Corporation of Redwood City, Calif. (Oracle is a registered trademark of Oracle Corporation). Most relational database management systems support the relational language SQL ("Structured Query Language", pronounced sequel). SQL is both a query language and a database programming language. In many systems, SQL may be accessed through an interactive interface (DB2I in the case of DB2) and an application programming interface. In addition, SQL may often be used as an embedded language ("embedded or dynamic SQL") in a general purpose programming language, such as PL/I in the case of DB2.

Not all database management systems are based on a relational model. An important alternative model is implemented in hierarchical database management systems. In such a system, the user may see the data organized into trees, each of which may have its own structure depending on the nature of the data it contains. A tree will have a single "root" record type, together with a set (possibly empty) of subtrees. Each subtree similarly will be seen as having a root and its own set of subtrees, and so on. Examples of commercial hierarchical database management systems include the original IMS from IBM (IMS is a registered trademark of IBM); and the MACCS™ and REACCS™ databases and systems from Molecular Design Limited of San Leandro, Calif. (MACCS™ and REACCS™ are trademarks of Molecular Design Limited.)

One non-first normal form extension to the relational model in which row-and-column values may be tables (including NFNF tables) we will call a "hierarchic relational database". The corresponding local external schema we will call a "hierarchic relational view". In a hierarchic relational database and view, a relation can be a tree that contains several hierarchic levels that define a one-to-many dependency between data. At any level, a parent table can include values that represent a set of records in a child table, which must be at an immediately lower level. Each table at a subordinate level can have many records for each record in the parent table. Records in the child table are joined to records in the parent table. This may occur either (i) when the values in certain fields of the parent and child tables (called "linking fields") are equal, or (ii) through the use of internal pointers, which are commonly used in non-relational database management systems. In the hierarchic relation, the parent-child relationship thus creates a link similar to an SQL join between master and detail tables. More correctly, the link in the hierarchic relation is similar to an outer join, in that it includes even master records that have no detail records.

Because it has minimal constraints and can be used in a natural way to express interrelationships among sets of databases that include hierarchical, relational and other kinds of databases, the hierarchic relational view may be used to define the structure of a multi-database in multi-database system. (A multi-database system is one that integrates the operation of multiple and possibly disparate databases managed by their native database management systems.) One multi-database system that uses a hierarchic relational view as a local external schema is the ISIS/Host multi-database system available from Molecular Design Limited of San Leandro, Calif. (ISIS™ is a trademark of Molecular Design Limited.) In ISIS/Host, the integrated database is defined by creating what is called in the system an "Hview" (a hierarchical view). An Hview is defined by an Hview definition file, which is created and maintained by a database administrator. In a simple system, the Hview definition file will point to one or more databases (relational or otherwise) on one host computer. In a network environment, the Hview definition file may point to network connections and databases located on various network nodes. Using Hviews, the database administrator can hide the network and database complexity from the data user and ISIS/Host can present the integrated data as if it came from a single database.

In a multi-database system, such as one just described, and in particular where databases are distributed across a computer network, the multi-database system must have methods for search and retrieval operations that reference fields in multiple databases in such a way that good system performance and user responsiveness are achieved. Obtaining good performance for such operations is particularly challenging when a query requires that searches in one database be performed in terms of intermediate results obtained from searches on different databases, which perhaps are resident on different computers.

SUMMARY OF THE INVENTION

The present invention provides computer-based methods that are useful in the efficient implementation of multi-database systems. The invention will be of interest to those developing systems that integrate search and retrieval operations across heterogeneous databases, and in particular to those developing systems that integrate multi-vendor relational databases.

For the sake of brevity, a set of fields in a database that are directly accessible through one name is referred to in this specification as a "segment". "Segment" is thus generic to the terms "table" and "relation", which are specific to relational databases. In a relational database, the fields of a table are seen as organized into "rows" or "records". Similarly, a segment defines a set of records or, if the context requires, a record type. (In the material in the included appendices, the term "tree" is used as a synonym for "segment".)

In the present invention, a method is provided for performing search operations over fields in multiple segments, where the segments are logically linked together to define a hierarchic relational view. The invention provides a method that applies parts of the search operation's search criterion to their corresponding segments and augments the segments' search criteria with predicates that link them to direct child segments in the hierarchic relational view. The method performs the segments' searches in a bottom-up or top-down fashion, using incremental search results to drive searches in neighboring segments, in accordance with the hierarchy defined in the view.

This method of the invention is referred to as the "incursor method" because of its use of the INCURSOR operator, which will be described below. In one implementation of the incursor method, each searched segment has a "cursor" associated with it. A "cursor" in this context is a placeholder for the status of a search or retrieval operation on a segment, and is to be distinguished from the "cursor" that is an element of the dynamic SQL language, which will be referred to specifically as a SQL cursor in this specification. If a segment occurs more than once in the view, as limited by the scope of the search, each occurrence has a separate cursor associated with it. In one implementation of the incursor method, cursors are implemented as objects (in the object-oriented program sense) whose methods may be invoked to perform the search and retrieval operations required by the incursor method.

Where a value in a segment in the hierarchy is another segment (i.e., a lower-level segment), a cursor will represent that value, pointing to records in the next hierarchical level. When a cursor has search criteria associated with it, the cursor will point to and represent the appropriate subset of the records of the lower-level table.

In the incursor method, a search criterion (also called a filter predicate or a search predicate) may be attached to a cursor. In general, the criterion is defined by a set-theoretic expression whose elements may include conventional set predicates, comparison predicates, database field values, and a special predicate operator, INCURSOR. The INCURSOR operator has two arguments: (i) a list of fields, the "linking fields", in the current cursor's segment, and (ii) another cursor, called the "foreign cursor", which is a cursor for a segment, generally a different segment, in the view. The foreign cursor represents a foreign search, that is, a search of (generally) a different database segment. For a given record (the "local record") in the cursor's segment, the value of an INCURSOR expression is TRUE only if there exists at least one record satisfying the foreign search that has the same linking field values as does the local record. Thus, INCURSOR provides a way of determining whether the given tuple in the local record is equal to any of the tuples yielded by (i.e., "is among the results of") the foreign search. The INCURSOR operator defines a generalized equivalent to a SQL subselect across a pair of any kinds of segments.

The present invention also provides a method, which is referred to in this specification as the "theta-join method", that satisfies the requirements of a purely relational model. The theta-join method will join relational tables from different databases and different database management systems.

The theta-join method performs an inner, relational theta-join with a select list of field expressions and with a filter predicate over a pair of relational tables that are managed by different database management systems and that have a set of linking fields between them. In the method, the filter predicate is reduced to a conjunctive form (that is, a form having an AND as top-level predicate), that in one embodiment is required to be conjunctive normal form. The factors of the reduced predicate are then divided into (i) factors whose field references are solely to the first table, (ii) factors whose field references are solely to the second table, and (iii) the remaining, mixed, factors. A query of the first table is made to retrieve incrementally the records (rows) that satisfy the first table factors and that have no NULL linking fields, and for each record retrieved, the following steps are performed. First, a query of the second table is made to retrieve incrementally records that satisfy the second table factors and that have linking field values satisfying the theta relationship with respect to the linking field values of the record retrieved from the query of the first table. Then, for each record retrieved from the second table in the preceding step, the mixed factors are evaluated: if the result of the evaluation is TRUE, the values of the field expressions in the select list are calculated and provided as the first (next) row produced by the theta-join.

From the foregoing summary, it will be clear that the present invention is advantageous over prior art systems and methods in several ways. First, the invention provides systems and methods that facilitate the integration of databases implementing different schemas, such as relational, hierarchical, and network.

In addition, the invention provides a system and method that facilitates the integration of hierarchical, relational, text and other kinds of database management systems.

In addition, the invention provides a system and method that facilitates the implementation of search, retrieve, and modify operations across a collection of linked database management systems.

In addition, the invention provides a system and method that facilitates the implementation of search operations that provide incremental results when implemented across a collection of linked database management systems.

In addition, the invention provides a system and method that facilitates the performance of direct searches within a hierarchic relational database schema, without requiring a search of the top-level table in the schema.

In addition, the invention provides a system and method of expressing search queries that is effective over a hierarchic relational database schema and results in queries and subqueries that are less complex than queries expressed in other ways.

These and other objects and advantages of the invention will become more fully apparent when the following detailed description of the invention is read in conjunction with the accompanying drawings.

DETAILED DESCRIPTION OF THE INVENTION

The following description encompasses the best presently contemplated mode of carrying out the invention. The description is made for illustrating the general principles of the invention and is not to be taken in any limiting sense.

Figure 1:
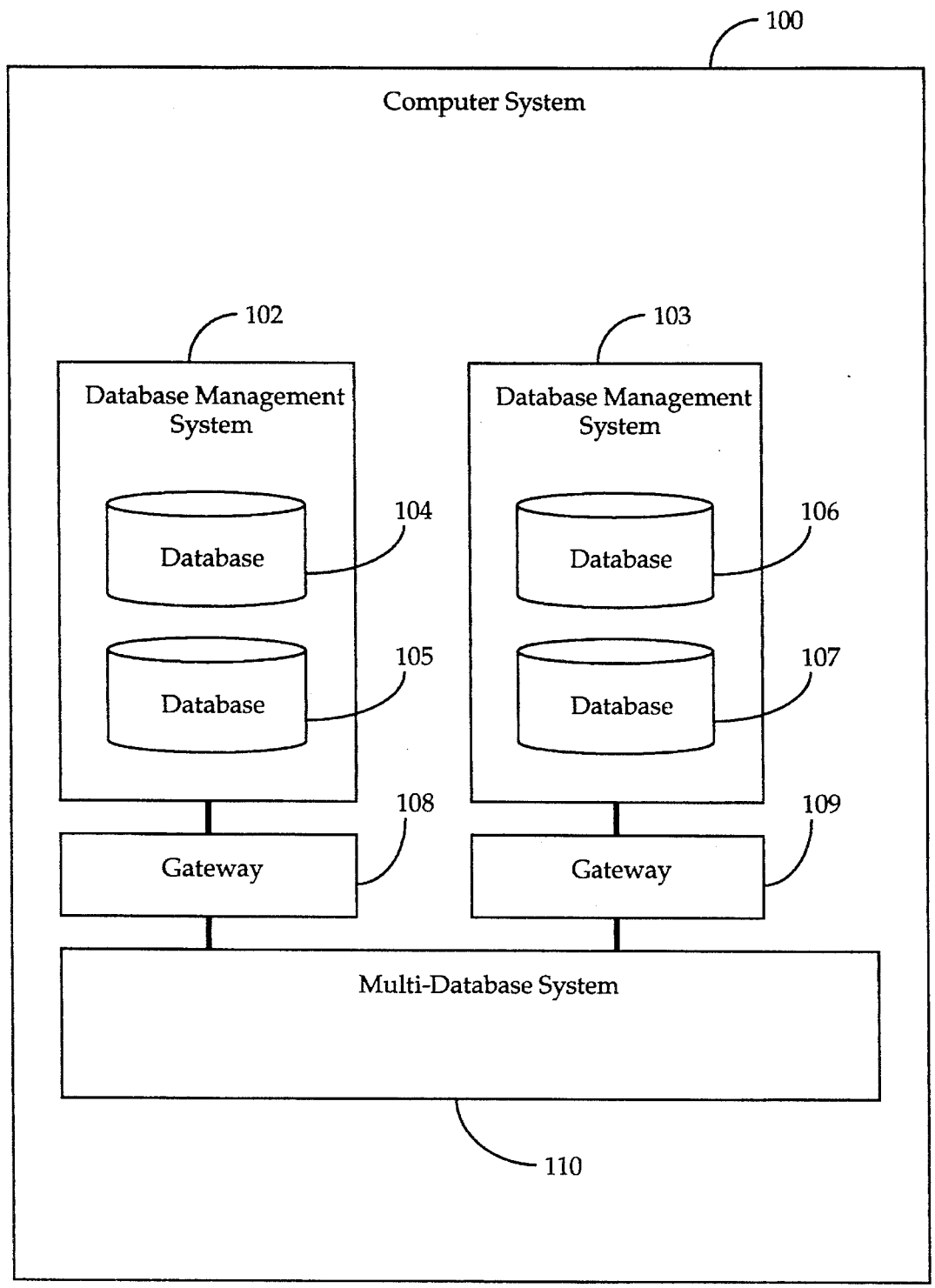
FIG. 1 is a general block diagram illustrating a computer system in which the invention may be employed.

Turning to FIG. 1, the context of an embodiment of the invention will now be described. In the embodiment, the invention exists in connection with a computer system 100 made up of one or more computers (not shown) having memory (not shown) which computer programs may be executed and having data storage media (not shown) for storing persistent data. Operating on the computer system are one or more database management systems 102 and 103, each of which may manage one or more databases 104, 105, 106 and 107. The database management systems 102 and 103 are programmatically connected, perhaps through a gateway 108 and 109, to a multi-database system 110, also operating on the computer system 100.

Figure 2A:
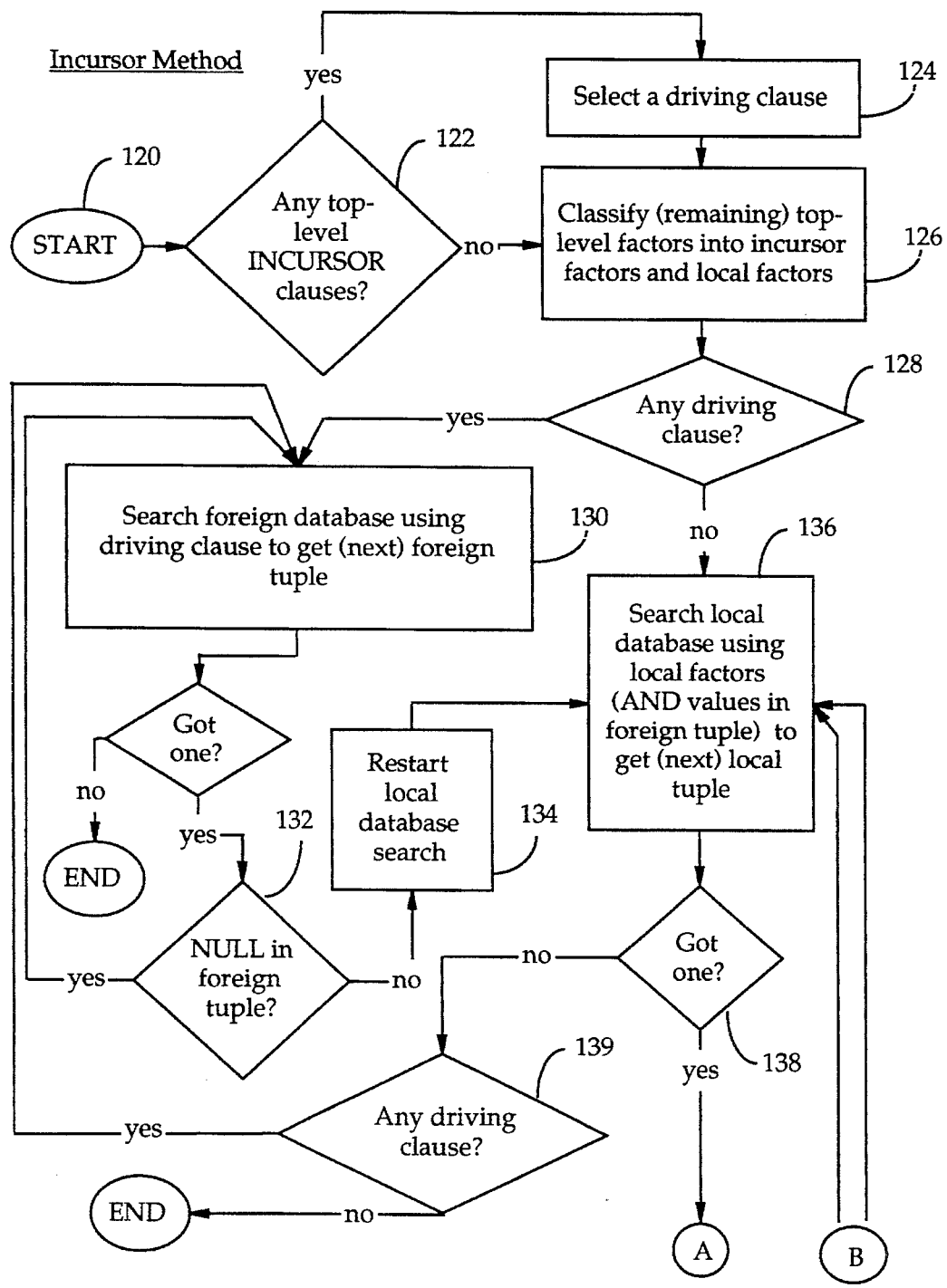
FIGS. 2A–2B are a flow chart for the incursor method of the invention.
Figure 2B:
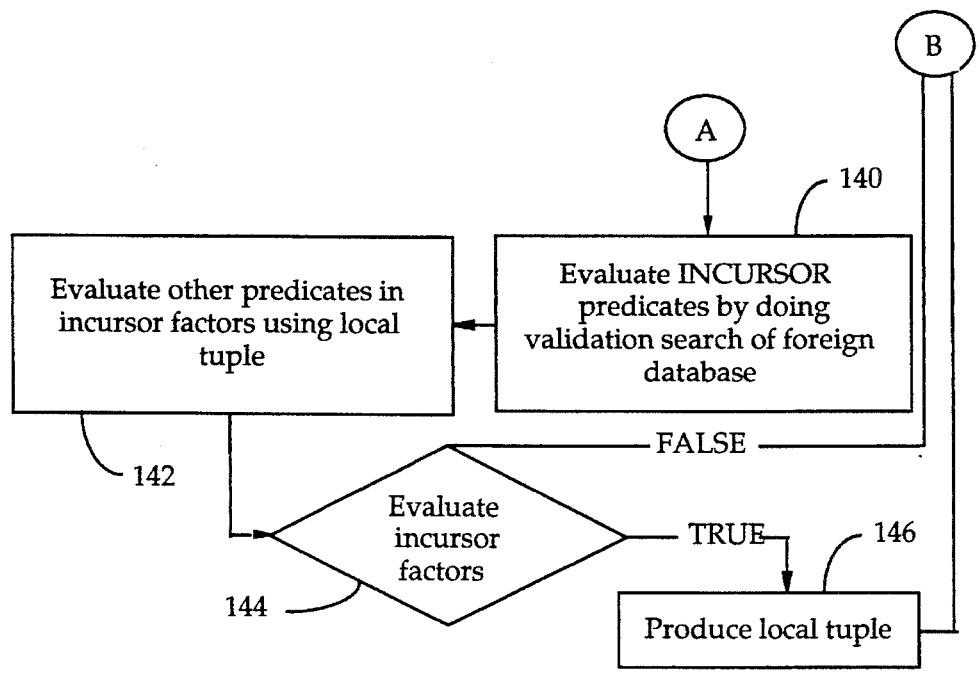
Figure 3:
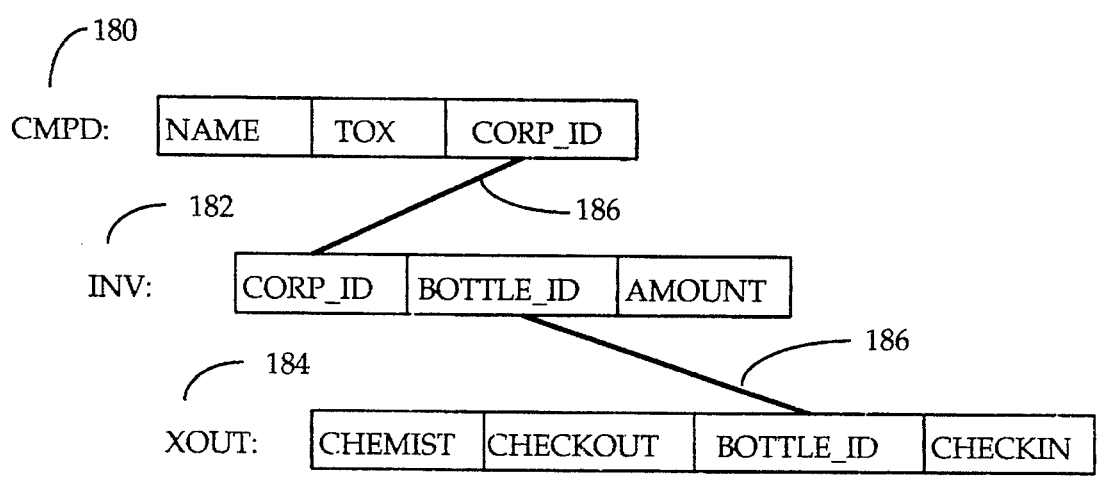
FIG. 3 illustrates an example of the incursor method of the invention.

Turning now to FIGS. 2A–2B and 3, the incursor method of the present invention will be described. FIGS. 2A–2B are a flow chart, whose steps are set forth below, of an embodiment of the method of the present invention for performing a search over a segment defining records in a database, where the search predicate specifies not only mutual relationships among the fields in each record, but also relationships between fields in each record and values obtained from other searches, possibly in other segments in other databases managed by other database management systems. As set forth, the method is presented for one search predicate. However, it will be appreciated that the method, when invoking other searches, may invoke searches having predicates that specify further searches, each of which may be performed by the present method in a recursive fashion.

The search predicate will come from the calling environment in which the method is invoked. The search predicate is expressed as a logical combination (AND, OR, NOT) of base predicates, where each base predicate can be applied to a record and evaluated to TRUE, FALSE or UNKNOWN given the field values in the record. Each logical combination can likewise be evaluated from the base predicate values using conventional three-valued logic. In this specification, predicates and operators are presented in prefix form.

At least one of the base predicates in the search predicate is what we will call an INCURSOR predicate. Syntactically, INCURSOR has the following form:

INCURSOR <list_of_local_fields><foreign_search> where

<list_of_local_fields> specifies a tuple (that is, an ordered list of a specific size) of fields in the records being searched; and <foreign_search> specifies a different search, referred to as the foreign search, that yields a set of value tuples of the same size as <list_of_local_fields> and, presumably, where each of the corresponding pairs of values has the same meaning.

The semantics of INCURSOR is "is among the results of". For a given record, the value of an INCURSOR clause is TRUE only if there exists at least one tuple from the foreign search that equals the tuple of values taken from the <list_of_local_fields> of the local record.

The INCURSOR clause semantics requires that two mechanisms be available with respect to each <foreign_search>:

1) Production: obtaining all distinct tuples from the foreign search, one at a time; and 2) Validation: validating a given tuple of values against the foreign search, that is, determining whether the given tuple is equal to any of the tuples yielded by (i e., "is among the results of") the foreign search.

The search predicate must be transformable to a conjunction of independent factors. That the factors are independent means that no factor contains references to values in more than one segment. For this purpose, an INCURSOR base predicate term is considered to contain references only to the values produced by the foreign search.

Steps of Incursor Method

Turning now to FIGS. 2A–2B, the steps of an embodiment of the incursor method will be described.

Step 1:

At the start 120 of the method, the search predicate is a top-level AND conjunction of independent factors. It may be advantageous to reduce the search predicate to conjunctive normal form to maximize the number of top-level factors.

Step 1.1:

Test 122 and blocks 124 and 126 classify the top-level factors into three categories as follows:

At test 122 and block 124, if one or more of the top-level factors is an INCURSOR clause, select one of these INCURSOR clauses as the <driving_clause>. (It may be preferred to permit the calling environment determine whether any clause is to be the <driving_clause>, and if so, which one, in which case an alternative embodiment of this step would select as the <driving_clause> only an INCURSOR clause that has been selected by the calling environment.)

At block 126, classify the remaining top-level factors into those that contain INCURSOR clauses (<incursor_factors>) and those that do not (<local_factors>). (Independence requires that <local_factors> refer only to values in the local database segment.) After classification of the top-level factors, the predicate may be expressed as:

(AND <driving_clause> (AND <local_factors>) (AND <incursor_factors>))

It is possible that any one of the three classes contains no clauses, in which case the corresponding factor is absent.

Step 1.2:

At test 128, if there is a <driving_clause>, use Scheme A below. Otherwise use Scheme B.

Scheme A

Step A.1:

Iterate over the distinct tuples produced by the foreign search of <driving_clause> beginning at block 130 and looping back at test 139. At test 132, if the foreign tuple contains any NULL values, proceed to the next tuple by returning to block 130; otherwise, proceed to block 134 and do the following:

Step A.1.1:

At block 136, perform a database search using a predicate of the form (AND <local_factors> (=<fld-1><val-1>) ... (=<fld-n><val-n>))

where <val-i> represents the i-th value in the foreign tuple, and <fld-i> represents the corresponding database field specified in <driving_clause>.

Step A.1.2:

As long as there are records, test 138, iterate over the records satisfying the search. For each record, do the following:

Step A.1.2.1:

At block 140, evaluate each of the INCURSOR base predicates in <incursor_factors> by validating the tuple of values of the specified fields against the foreign search. If any value in a tuple is NULL, the corresponding INCURSOR clause is given a value of UNKNOWN.

Step A.1.2.2:

Then at block 142, evaluate the remainder of the base predicates in <incursor_factors> using the field values in the record.

Step A.1.2.3:

Then at test 144, evaluate the <incursor_factors>. If the result is TRUE, the record satisfies the overall search, and should be consumed at block 146 in whatever manner is appropriate for the application, e.g., recorded as a "hit" or made available to the calling environment for manipulation. This may be for display, update, delete and so on.

Scheme B

Step B.1:

At block 136, perform a database search using a predicate of the form (AND <local_factors>). If there are no <local_factors>, the result of this search is all records. (Note that in Scheme B, there are no foreign tuples.)

Step B.2:

As long as there are records, test 138, iterate over the records satisfying the search. For each record, do the following (note these are the same as steps A.1.2.1 through A.1.2.3):

Step B.2.1:

At Block 140, evaluate each of the INCURSOR base predicates in <incursor_factors> by validating the tuple of values of the specified fields against the foreign search. If any value in a tuple is NULL, the corresponding INCURSOR clause is given a value of UNKNOWN.

Step B.2.2:

Then at block 142, evaluate the remainder of the base predicates in <incursor_factors> using the field values in the record.

Step B.2.3:

Evaluate the <incursor_factors>. If the result is TRUE, the record satisfies the overall search, and should be consumed in whatever manner is appropriate for the application, e.g., recorded as a "hit" or made available to the calling environment for manipulation. This may be for display, update, delete and so on.

END of Steps.

Example of Incursor Method

The foregoing incursor method is particularly useful when used recursively to perform a search over multiple databases. Consider as an example three databases, illustrated in FIG. 3.

1) CMPD: A database 150 containing information about chemical compounds, whose fields include NAME 152 (the name of the compound), CORP_ID 154 (the corporation's unique identifier for the compound), and TOX 156 (a number representing the toxicity of the compound).

2) INV: A database 160 containing information about the inventory of chemical compounds, whose fields include CORP_ID 162 (as above), BOTTLE_ID 164 (the corporation's unique identifier for each bottle in inventory) and AMOUNT 166.

3) XOUT: A database 170 containing information about the checking out and in of bottles from inventory, whose fields include BOTTLE_ID 172 (as above), CHEMIST 174 (name of chemist checking bottle out), CHECKOUT 176 (date when bottle was checked out), and CHECKIN 178 (date when bottle was checked in, which has the value NULL until bottle is checked in).

For this example, consider a query that asks "what are the names of the highly toxic compounds Chen still has checked out?" For this example, "highly toxic" will mean having a toxicity of greater than 900, which in the notation used above can be expressed as the predicate (>TOX 900). Using the operator RETURN (whose semantics will be described below), the query could be expressed in three levels as follows:

(1) top level:
   RETURN NAME FROM CMPD WHERE (AND (>TOX 900) (INCURSOR CORP_ID <search_of_INV>))
(2) <search_of_INV>, which could be expressed as:
   RETURN INV.CORP_ID FROM INV WHERE (INCURSOR BOTTLE_ID <search_of_XOUT>)
(3) <search_of_XOUT>, which could be expressed as:
   RETURN XOUT.BOTTLE_ID FROM XOUT WHERE (AND (=CHEMIST "Chen") (ISNULL CHECKIN))

The RETURN operator makes available the value(s) of its first operand field(s) for the first (or, in subsequent invocations, the next) record produced by the search of the current database, whose name follows FROM. The semantics of RETURN may be extended also to make available the current record itself, possibly for a modify or delete operation.

Applying the incursor method to the foregoing example, it will operate at three levels 180, 182 and 184. The expressions <search_of_INV> and <search_of_XOUT> are the foreign search cursors or, more simply, the foreign cursors. In step 1 at the CMPD level 180, <search_of_INV> is selected as the <driving_clause> and the method proceeds to scheme A. The method then begins a scan of the values of the first foreign cursor <search_of_INV> to get a first (or, in subsequent invocations, the next) value of CORP_ID. This invokes the incursor method at the INV level 182 in production mode.

When the method is invoked at the INV level 182, <search_of_XOUT> is selected as the <driving_clause> and the method proceeds to scheme A. The method then begins a scan of the values of the foreign cursor <search_of_XOUT> to get a first (the next) value of BOTTLE_ID. This invokes the incursor method at the XOUT level 184 in production mode.

When the method is invoked at the XOUT level 184, the entire predicate is local: The method thus proceeds to scheme B and performs a search of XOUT with the predicate (AND (=CHEMIST "Chen") (ISNULL CHECKIN)), positions to the first (next) record in XOUT satisfying the predicate, and makes the value of XOUT.BOTTLE_ID from that record available to the INV level 182.

Back at level (2), the method searches INV with the predicate (=INV.BOTTLE_ID <value_from_XOUT_level_184>) and positions to the first (next) record in INV satisfying the predicate. It then makes the value of INV.CORP_ID from that record available to the CMPD level 180.

Back at the CMPD level 180, the method searches CMPD with the predicate (AND (> TOX 900) (=CMPD.CORP_ID <value_from_inv_level_182>)) and position to the first (next) record in CMPD satisfying the predicate. It then makes the value of fields in <select_list> in that record available to the calling context.

The methods at the three levels then return recursively to the "position" steps to position to the next records until all records have been found. It should be noted that by use of the incursor method as illustrated a system is able to return (make available) the first compound name satisfying the user's query before the system has found all the checked-out bottles, thus enabling the system to give the user a quick and incremental response to the query.

Relation to SQL Subselect

It should be noted that the use of the incursor method over two tables managed by one relational database management system could be logically equivalent to a SQL subselect statement. In one embodiment using the incursor method, it is found to be advantageous to use a SQL subselect statement, if possible, in place of an equivalent incursor query for the lowest two levels (levels 182 and 184 in the foregoing example) of the search, where those two tables are both managed by the same relational database management system.

The preceding example illustrates the use of the incursor method to select values from top-level records (CMPD table) based upon predicates in lower-level tables (INV and XOUT). It will be noted that the method does not give the calling environment direct access to fields in the lower-level tables. For example, a query that asks "what are the names of the compounds that Chen still has, and when were the bottles checked out?" requires access to CHECKOUT from the XOUT records satisfying the predicate (AND (=CHEMIST "Chen") (ISNULL CHECKIN)). The foregoing method does not provide such access directly.

In such cases, the calling environment may extract the value(s) of the linking field(s) 186 from an upper-level record and pose a search directly over the lower-level table with a predicate that reflects equality of the linking fields. To elaborate the example, if the first top-level record produced were to return a CORP_ID value of 10101 in addition to a NAME, the calling environment could immediately gain access to all of the corresponding INV records by posing an independent INV query with predicate (=INV.CORP_ID 10101). That search would yield all INV records related to the top-level record, including the one(s) that satisfied the INCURSOR predicate at the INV level. Similarly, for a particular INV record, say one with BOTTLE_ID=6543, the calling environment could pose an independent XOUT query with the predicate (=XOUT.BOTTLE_ID 6543).

The foregoing may be referred to as "unfiltered" retrieval of lower-level records because it accesses all of the lower-level records that correspond to a given upper-level record. By adding one or more additional predicates ("filter predicates") to those that specify equality of linking fields, the calling environment can effect "filtered retrieval". For example, with a top-level CORP_ID of 10101, the calling environment could search INV with the predicate (AND(=INV.CORP_ID 10101)(INCURSOR INV.BOTTLE_ID <search2_of_XOUT>))

where <search2_of_XOUT> is defined just like <search_of_XOUT> in (3) above, but is performed independently of it. Similarly, for an INV.BOTTLE_ID of 6543, the calling environment could search XOUT with the predicate (AND(=XOUT.BOTTLE_ID 6543)(=CHEMIST "Chen")(ISNULL CHECKIN))

to do a filtered retrieval of corresponding XOUT records.

Thus, the incursor method of the present invention may be used by a calling environment to effect not only searching a hierarchical relational database but also retrieving data from multiple levels of that database. It will be noted that the multi-level retrieval strategy just described requires, in the general case, that the underlying database management systems permit multiple, independent searches over tables at every level, so that the retrieval-related searches do not disrupt the main search query iterations.

Theta-Join Method

To satisfy the requirements of a purely relational model, the above search and retrieval steps are combined in a relational database management system into a single SQL SELECT statement specifying a relational theta-join over the linking fields. In terms of the preceding example, such a SQL SELECT statement would be:

SELECT CMPD.NAME, XOUT.CHECKOUT FROM CMPD, INV, XOUT WHERE CMPD.CORP_ID=INV.CORP_ID AND INV.BOTTLE ID=XOUT.BOTTLE ID AND XOUT.CHEMIST="Chen" AND XOUT.CHECKIN IS NULL where the predicate theta (Θ) in this example is equality (=).

This, in one sense, provides less information than does the result of the incursor method described above, because the theta-join erases the parent-child relationship between the component tables and produces a "flat" set of records taken from two or more tables. On the other hand, a relational theta-join has the advantage of being conceptually simpler, and it may require less repetitive searching of the individual tables. It is in this context that the "theta-join method" will be seen to be advantageous.

Figure 4:
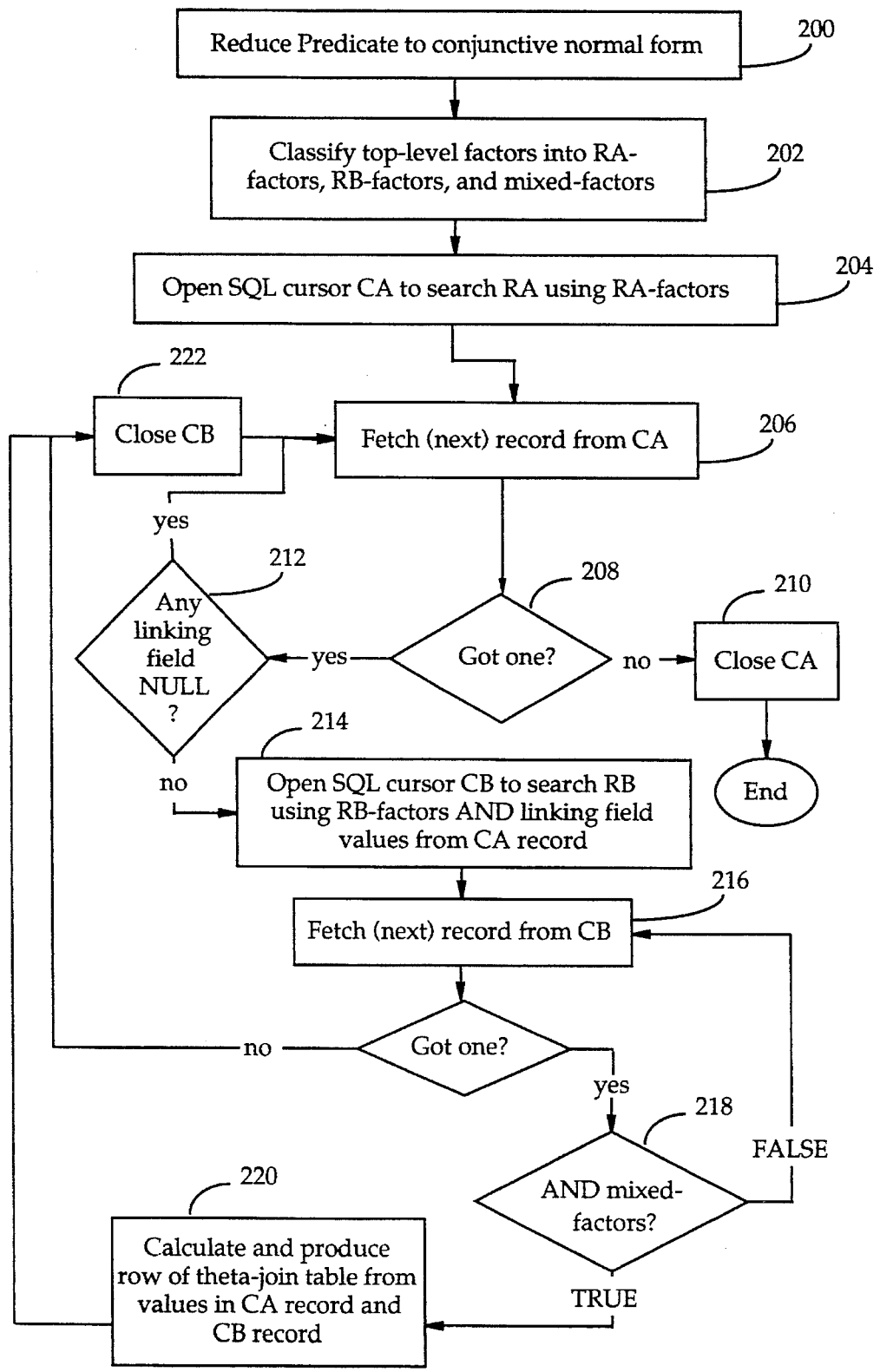
FIG. 4 is a flow chart of the theta-join method of the invention.

FIG. 4 is a flow chart, whose steps are set forth below, of the theta-join method of the present invention. This is a method for evaluating the relational theta-join operator, which takes as its operands two or more relational tables and yields what is logically a new table, which is a join of the operand tables. Unlike the linking by foreign cursor illustrated above, the theta-join method is specific to relational tables.

Set forth below is an embodiment of the method of the present invention for performing a theta-join operation on a number of databases linked to each other and retrieving a selected set of fields for joined records satisfying a query predicate. In the particular embodiment set forth, the method is used with relations in two relational databases. However, it will be readily understood that the method may be extended to three or more relations and that the method may be used even with different database management systems.

The context for the theta-join method is a calling environment that specifies the following:

1) Two relations RA and RB, each managed by a relational database management system (not necessarily the same relational database management system for RA and RB) and each with a set of local fields. Each relational database management system has a programmatic interface that provides for the preparation of dynamic SQL SELECT statements from string variables and the declaration of SQL cursors for such statements.

2) A SELECT list of field expressions whose values are to be retrieved and made available to the calling environment. Each field expression refers to one or more fields in RA, RB or both, and yields a value derived from the values of the referenced fields.

3) A set of linking fields in RA for each of which there is a distinct corresponding field in RB, such that there is an implicit relationship, theta, between a linking field in RA and its corresponding field in RB. Theta may be referred to as the join operator.

4) A predicate. This is considered to be an AND/OR/NOT combination of basic predicates, where each basic predicate comprises a comparison operator together with constants and references to fields in RA and RB sufficient to yield a value of TRUE, FALSE or UNKNOWN from a given set of values for the referenced fields. In the description of the method, the predicate is expressed in operator-prefix form.

Steps of Theta-Join Method

Turning now to FIG. 4, the steps of an embodiment of the theta-join method will be described.

Step 1:
At Block 200, Reduce the predicate to conjunctive normal form. In conjunctive normal form, the predicate will satisfy the following syntax:

predicate :=<factor>!(AND <factor> ... <factor>) <factor>
:=<term>!(OR <term> ... <term>) <term> :=<basic_predicate>!(NOT <term>)

Step 2:
Then, at block 202, categorize the <factor>s that make up the predicate into three classes, those that refer solely to fields in RA, those that refer solely to fields in RB, and those that refer to fields in both RA and RB. The predicate may then be expressed as:

(AND(AND <RA-factors>)(AND <RB-factors>) (AND <RA/RB-factors>))

It is possible that any one of these classes contains no clauses, in which case the corresponding (AND <xx-factors>) factor is absent.

Step 3:
Then, at block 204, compose a string containing the SQL query

SELECT <SQL_select_list> FROM <RA_name> WHERE <SQL-predicate> where <SQL_select_list> contains (i) field expressions in the SELECT list that reference only fields in RA, (ii) field names for any fields from RA referenced by other expressions in the SELECT list, and (iii) field names for any additional linking fields in RA;

where <RA_name> is the name of RA as it is known to the relational database management system; and where <SQL-predicate> is the SQL translation of the clause (AND <RA-factors>). If there are no <RA-factor>s, then the string contains the simpler query:

SELECT <SQL_select_list> FROM <RA_name>

Step 4:
Still in block 204, using the dynamic SQL interface for the relational database management system that manages RA, prepare the above string as a dynamic SQL statement, obtain a SQL cursor CA for accessing its rows, and open that cursor.

Step 5:
Iterate over the following steps 5.1 through 5.6:

Step 5.1:
At block 206, fetch the next (or first) record from CA.

If there are no (more) records, test 208, terminate this iteration loop (step 5) and proceed with step 6, below, at block 210.

Step 5.2:
Extract all of the field values from the record.

Step 5.3:
At test 212, if the value of any linking field is NULL, proceed with the next iteration of step 5, at block 206.

Step 5.4:
Otherwise, at block 214, compose a string containing the SQL query

SELECT <SQL_select_list> FROM <RB_name> WHERE <SQL-predicate> where <SQL_select_list> contains (i) field expressions in the SELECT list that reference only fields in RB, and (ii) field names for any fields from RB referenced by other expressions in the SELECT list;

where <RB_name> is the name of RB as it is known to the relational database management system; and where <SQL-predicate> is the SQL translation of the clause (AND <RB-factors>) connected by an AND operator with a <linking-predicate> of the form:

<val_1> Θ <col_1> AND ... AND <val_n> Θ <col_n> where Θ is the join operator, where each <val_i> is a string representation of the value extracted for one of the linking columns of RA in step 5.2, and where the corresponding <col_i> is the name of the respective column in RB. If there are no <RB-factor>s, then <SQL-predicate> corresponds directly to the <linking-predicate>.

Step 5.5:

Still in block 214, using the dynamic SQL interface for the relational database management system that manages RB, prepare the above string as a dynamic SQL statement, obtain a SQL cursor CB for accessing its rows, and open that cursor.

Step 5.6:

Iterate over the following steps 5.6.1 through 5.6.4:

Step 5.6.1:

At block 216, fetch the next (or first) record from CB. If there are no (more) records, terminate this iteration loop and proceed with step 5.7.

Step 5.6.2:

Extract all of the field values from the RB record.

Step 5.6.3:

If the factor (AND <RA/RB-factors>) is present in the predicate, evaluate this factor in test 218, using the values of the fields of RA and RB. If the value is FALSE or UNKNOWN, proceed with the next iteration of step 5.6, at block 216.

Step 5.6.4:

At block 220, calculate the values of all field expressions in the given SELECT list and make those calculated values available to the calling environment.

Step 5.7:

Continue iteration at block 222 and close the cursor CB.

Step 6:

Close the cursor CA, at block 210.

END of steps.

It should be noted that the theta-join method of the invention will operate correctly, although perhaps with less efficiency, if the reduction to conjunctive normal form of step 1 is not complete.

It should also be noted that generally none of the <RA/RB-factors> would be in the form (Θ field_from_RA field_from_RB), because such a relationship of fields would normally be considered and more efficiently treated as linking fields. However, the theta-join method will operate correctly whether or not such factors are treated as linking fields.

It may be noted that step 5.6.3 does not specify how one is to evaluate the factor (AND <RA/RB-factors>). If each relation RA and RB contains only standard SQL operators over standard SQL values, one may rely on the ANSI specification describing the evaluation of standard SQL operators over standard SQL values. However, it will be understood that the method of the invention is not limited to standard operators or standard values, and that it may be used with non-SQL programming interface. Thus, while methods for evaluating the factor (AND <RA/RB-factors>) are not part of the present invention, such methods must be available either in the database management systems that manage RA and RB, or in the environment in which the present invention is used.

It may also be noted that, in some situations, a field expression may reference only values from one table. In that case, the foregoing method may treat such expressions as derived fields that may be used in the method as simple fields.

It may also be noted that it is possible, and may be advantageous, to include the NULL value check (step 5.3) within the <RA-factors>.

There is a variation on the foregoing method in which the steps of constructing and preparing the second SQL statement and obtaining SQL cursor CB (step 5.4 and part of step 5.5) are moved out of the step 5 loop, to a point between steps 4 and 5. In this variation, the second SQL statement must contain SQL-variable references ( e.g., ... <fieldname> Θ:X ... in ORACLE; or ... <fieldname> Θ? in Ingres). Steps 5.4 and 5.5 then would consist of opening CB using a binding mechanism provided by the relational database management system for RB, where that mechanism provides for an association of field values with the respective variable references in the prepared SQL statement.

Figure 5:
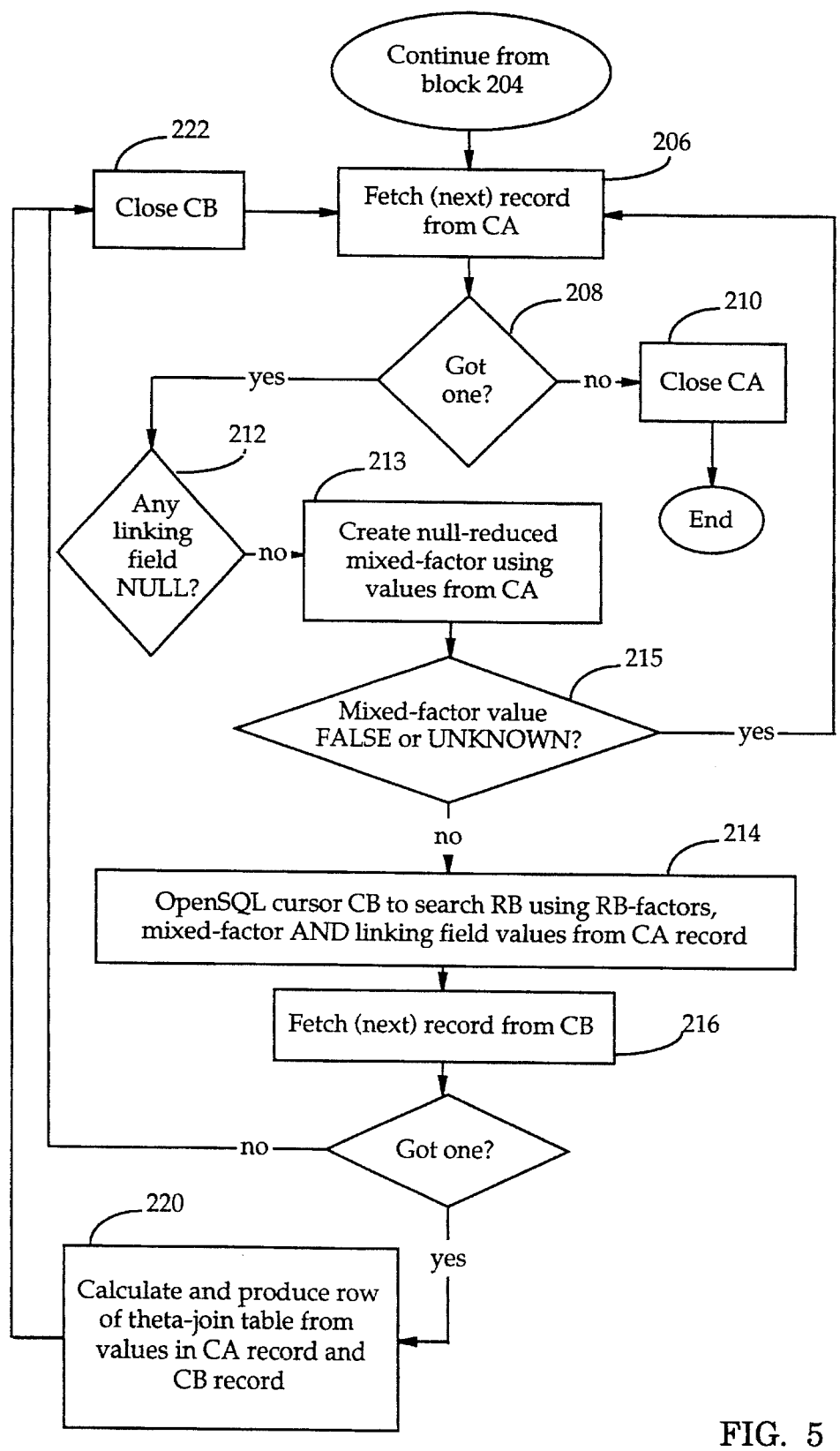
FIG. 5 is a flow chart showing the distinctive steps of the NULL-reduction alternative embodiment of the theta-join method.

Turning to FIG. 5, an alternative embodiment of the theta-join method is described. In this embodiment, the RA values extracted in step 5.2 are substituted into the <RA/RB-factors>, and the resulting new expression, which contains only constants and references to fields in RB, is partially evaluated and reduced to account for the effect of NULL values from RA. The result is a new factor, <RB-factor-2>, that can be conjoined with <RB-factors> for the remainder of the algorithm. In this embodiment, step 5.6.3 is unnecessary because the corresponding evaluation and test can be incorporated into step 5.4. An advantage of this alternative is that it reduces the complexity of the filter predicate that must be evaluated when searching RB, while leaving the evaluation of operators to the database management system that manages RB. Thus, any special characteristics of the interpretation of operators by the database management system are preserved.

As an example, consider <RA/RB-factors> with the form (OR (=<RA.x> 23) (=<RB.y> 'Smith')), where <RA.x> refers to a field in RA and <RB.y> refers to a field in RB. Suppose that at step 5.2, a NULL value is obtained for <RA.x>. Substituting this value into the <RA/RB-factors> yields:

(OR(=NULL 23)(=<RB.y> 'Smith'))

This expression can be partially evaluated, using the rule in ANSI-standard SQL that specifies a comparison operator applied to a NULL value yields UNKNOWN to:

(OR UNKNOWN(=<RB.y> 'Smith'))

This clause cannot be TRUE unless the second clause is TRUE, so <RA/RB-factors> can be replaced by the reduced logical equivalent:

(=<RB.y> 'Smith')

In this example, the reduction process removes the distinction between FALSE and UNKNOWN as the value of <RA/RB-factors>. As can be seen in step 5.6.3, however, this is immaterial to the final result.

To effect this alternative embodiment, the theta-join method described above would be modified at steps 5.3, 5.4 and 5.6.3, as illustrated in FIG. 5. First, after step 5.3, at block 213, a new step 5.3a is inserted, as follows:

Step 5.3a:

Create a new factor by substituting the values of step 5.2 into <RA/RB-factors>, replacing each RA field reference by its corresponding value. Then partially evaluate and reduce this new factor using the NULL-reduction technique to yield a reduced factor <RB-factors-2>. At test 215, if <RB-factors-2> has the simple value FALSE or UNKNOWN, proceed with the next iteration of step 5, at block 206.

Step 5.4 is modified in the part where <SQL-predicate> is created. Unless the <RB-factors-2> created at step 5.3a has the simple value TRUE, <RB-factors-2> is conjoined with <RB-factors> and <linking-predicate> to form <SQL-predicate>.

Finally, step 5.6.3 is unnecessary in this alternative embodiment as is not performed.

The NULL-reduction technique mentioned in step 5.3a is an application of the rules of three-valued (TRUE/FALSE/UNKNOWN) logic. Its purpose is to modify an expression so that the logical consequences of any NULL values are propagated through the expression according to the following rules. As noted above, some of the clauses in the expression may contain references to fields in another relation (RB in this case). These are generally retained in the final expression unless propagation of NULL values shows them to be immaterial to the value of the expression. For example (OR(ISNULL NULL)(EQUAL <RB.y> 'abc'))

is TRUE whether or not (EQUAL <RB.y> 'abc') is TRUE. Thus the entire OR clause may be removed from the expression and replaced with TRUE in this case.

Exactly one of the following rules will apply to a given expression. The rule that applies depends on the type of the expression:

1. For an expression that combines data values using a value-combination operator (e.g., addition or multiplication of data values): If any of the data values if NULL the expression itself is replaced with NULL.
2. For an expression that tests for NULL data values (the ISNULL operator): If the operand is NULL the expression itself is replaced with TRUE.
3. For an expression that compares data values using a comparison predicate (e.g., EQUAL, GREATER, LESS): If any operand is NULL the expression itself is replaced with UNKNOWN.
4. For a NOT expression: If the operand is TRUE the expression itself is replaced with FALSE, if the operand is FALSE the expression itself is replaced with TRUE, and if the operand is UNKNOWN the expression itself is replaced with UNKNOWN.
5. For an AND expression: If any operand is FALSE the expression itself is replaced with FALSE. Otherwise, if any operand is UNKNOWN the expression itself is replaced with UNKNOWN. Otherwise, if all operands are TRUE, the expression itself is replaced with TRUE. Otherwise, if all but one of the operands are TRUE, the expression itself is replaced with that operand. Otherwise, TRUE operands are removed from the list of operands of the expression.
6. For an OR expression: If all operands are FALSE, the expression itself is replaced with FALSE. Otherwise, if all operands are either FALSE or UNKNOWN, the expression itself is replaced with UNKNOWN. Otherwise if all but one of the operands are either FALSE or UNKNOWN the expression itself is replaced with that operand. Otherwise, FALSE and UNKNOWN operands are removed from the list of operands of the expression. (It should be noted that the last two cases above treat UNKNOWN and FALSE equivalently. In order for these two transformations to have correct logical effect, there can be no NOT containing this OR at any level. If the outermost containing expression is in either conjunctive or disjunctive normal form, this requirement will be satisfied.)
7. For any other type of expression: There is no change.

The application of the foregoing seven rules to subexpressions may create NULL, TRUE, FALSE or UNKNOWN values in their containing expressions. Thus when applying these rules to an expression, one first applies them recursively to all operands, then to the expression itself.

Implementation of INCURSOR and Foreign Search Cursors

The implementation of foreign search cursors and INCURSOR operations are illustrated in Appendix A—Microfiche of Source Code for Flat-File Gateway and described in Appendix B—ISIS™/Host Open Gateway Developer's Guide, both included as appendices with this application. The portion of the flat-file gateway that handles the INCURSOR operator during searching is located in the file FILESEARCH.C. It is coordinated by the routines user_opencursor() and user_positioncursor() in the file UUSER.C, which perform the operations described below:

UUSER.C:user_opencursor()

Add link values, if any, to query.

Initialize search by calling FILESEARCH.C:init_filesearch().

Searches for first record by calling FILESEARCH.C:next_filesearch().

(If no records are found by the search, it returns this fact to the caller; otherwise it responds that an unknown number of records was located.)

UUSER.C:user_positioncursor()

Call FILESEARCH.C:next_filesearch() as necessary, to position to the desired record. (Only necessary when asked to position to a record number higher than the highest already asked for; prior records are stored in an array for quick access.)

The principal routines in FILESEARCH.C involved in the handling of INCURSOR operators are listed and described below:

FILESEARCH.C:init_filesearch()

Sets search state to "no search is pending".

FILESEARCH.C:next_filesearch()

If state is "no search is pending", initialize for searching:

(The following two steps correspond to step 1.1. in the description of the incursor method.)

If there is a reference cursor, use this as the <driving_clause>—it is implicitly an INCURSOR connected by AND logic to the rest of the query. (The use of a reference cursor is a way for the calling environment to identify a <driving_clause>.)

Otherwise, look through the query for an INCURSOR which can be used as a <driving_clause>. (There may be none; note that any INCURSOR which is connected by AND logic to the rest of the query may be selected.)

If there is a <driving_clause>, open its cursor and verify that it returns at least one record. (If it returns none, then the search is complete, with no records possible.)

Set state to "search in process".

If state is "search in process", then:
  If there is a <driving_clause>, then: (Scheme A.)
    For each tuple retrieved from the <driving_clause>'s cursor:
      For each record in the database (i.e., in the flat-file): Call
        FILESEARCH.C:do_filesearch() to determine if this database record's tuple matches the cursor's tuple. (This is A.1.1, but without considering <local_factors>.)
      If so, then:
        Validate all other predicates in the query against this record by calling FILESEARCH.C:do_filesearch()—if record is a hit, return this record to the caller; when control returns to this routine, continue with next record in database. (A.1.2.1, A.1.2.2, and A.1.2.3.)
  Else if no <driving_clause>: (Scheme B.)
    For each record in the database (i.e., in the flat-file):
      Validate all predicates in the query against this record by calling
        FILESEARCH.C:do_filesearch()—if record is a hit, return this record to the caller. (B.2.1, B.2.2, and B.2.3.)

FILESEARCH.C:do_filesearch()

Handles Steps A.1.2.1, A.1.2.2, A.1.2.3, B.2.1, B.2.2, and B.2.3.

Evaluates the query against a record in the database. INCURSOR predicates are evaluated by validating the tuples of the record against each INCURSOR's foreign search.

The Gateway System

Figure 6:
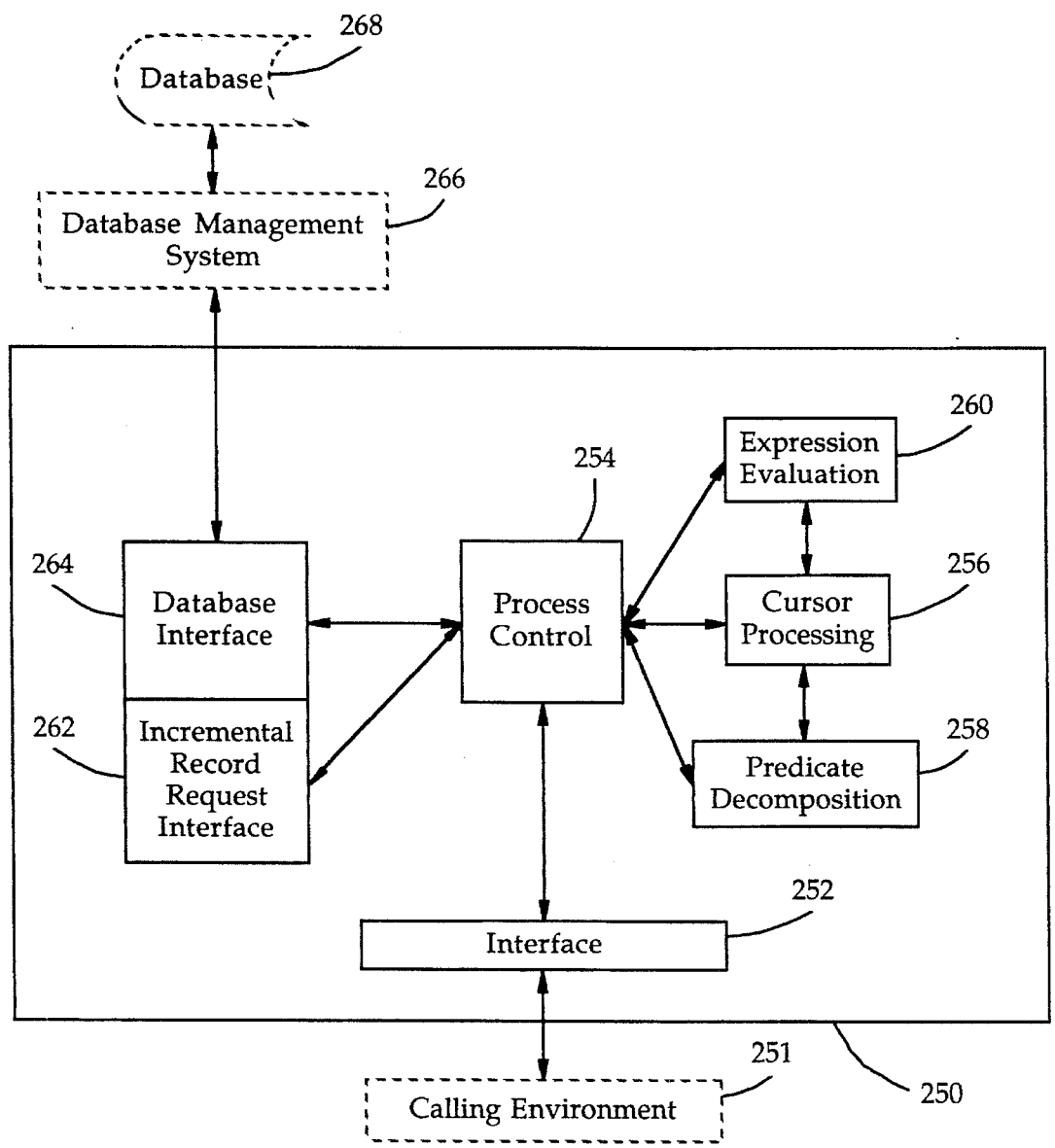
FIG. 6 is a conceptual block diagram illustrating the system of the invention.

Turning now to FIG. 6, a gateway system useful for the performance of the INCURSOR method of the invention will be described. One embodiment of such a system is described and illustrated in Appendices A and B. The relationship of this embodiment to the elements of FIG. 6 will be discussed later, after the figure is described below.

The gateway system 250 is designed to operate within a calling environment 251 through an interface 252 and to use a database management system 266 to interact with a database 268. Calling environment 251 may be a multi-database management system such as ISIS/Host, which has been previously mentioned.

Interface 252 is configured to receive from calling environment 251 a search predicate, possibly containing INCURSOR factors, and to route the search predicate to process control module 254.

Process control module 254 interacts with all remaining parts of gateway system 250. Process control modules 254 makes use of predicate decomposition module 258 to separate the predicate into as many as three types of factors: (a) incursor predicates; (b) incursor factors, being factors that contain INCURSOR predicates at any level; and (c) local factors, which do not contain INCURSOR predicates.

Process control module 254 also accesses both database interface 264, through which local database searches can be executed, and incremental record request interface 262, through which incremental access can be gained to the database records satisfying such a search.

Process control module 254 also connects to cursor processing subsystem 256, which manipulates INCURSOR predicates at any level, as identified by predicate decomposition module 258. Cursor processing subsystem 256 implements mechanisms both for evaluating an INCURSOR predicate over a given tuple of local data values and for incrementally obtaining distinct tuples from the foreign cursor operand of an INCURSOR predicate. Such INCURSOR evaluations may require interaction with calling environment 251, which is mediated by the process control module 254 through interface 252.

Process control module 254 also accesses expression evaluation module 260, giving the module a record from the database, and obtaining from the module a value of TRUE only if the record satisfies all of the INCURSOR factors identified by predicate decomposition module 258.

Finally, through interface 252, process control module 254 presents to calling environment 251 records that are accessed incrementally through the incremental record request interface 262.

These will be records for which a TRUE value is obtained from expression evaluation module 260.

Note that local database searches executed through database interface 264 either may correspond directly to local factors identified by predicate decomposition module 258, or they may correspond to a conjunction of local factors and other factors that derive from cursor processing subsystem 256. In particular, when an INCURSOR predicate is being used as a driving clause, a local search is augmented with factors that specify equality between the fields in the field list and the respective values in a foreign tuple obtained by cursor processing subsystem 256.

The correspondence between the elements of FIG. 6 and the source code in Appendix A for the Flat-File Gateway is set forth below.

Database 268: The database is simply a record-oriented text file existing within the VAX/VMS file system. (VAX and VMS are trademarks of Digital Equipment Corporation of Maynard, Mass.)

Database Management System 266: All basic data access functions are provided by the VAX/VMS file system, together with high-level language interfaces ('C' and FORTRAN) to it. The database management system in this case provides only a very simple type of record, with a single "field" containing arbitrary text. It is up to the other parts of gateway system 250 to provide for the definition of more complex field types (e.g., numbers), and to provide basic record searching capabilities that normally would be part of a database management system.

Database Interface 264: This part of the system is composed of files FILEIO.C, FILIO.H, FILEDEF.C and the virtual list array ("VLA") mechanism, which is a means for creating a virtual data array that may be accessed in a random fashion.

In FILEIO.C and FILIO.H are defined the low-level file access routines myfopen, myfclose, myfputs, myfgets. Based on a compile-time option, these can be defined in terms of a library of FORTRAN routines or they can be defined in terms of the 'C' functions fopen, fclose, fputs and fgets.

In FILEDEF.C are defined a set of higher-level access routines to do the following basic activities: read a format description that specifies the formatting of data values on each line of the data file; read the lines of the data file and extract field values according to the specified format; put the extracted values into a virtual array of data values (a VLA); and write a new data file by writing lines according to the specified format, getting the data values from the (updated) VLA.

Incremental Record Request Interface 262: Incremental access to the database records is provided by the VLA mechanism. When the database is first opened, the database file is read sequentially through database interface 264 and all extracted data items are stored in a VLA. Subsequently, the VLA system is used to access records in random-access fashion on an as-needed basis. This access takes place through the VLA function GetVLAElement.

Process Control Module 254: This part of the system is contained in file FILESEARCH.C. Overall control of the search process is provided by next_filesearch, with minor housekeeping tasks handled by functions init_filesearch and end_filesearch. When it is first called, next_filesearch calls process_incursor (in predicate decomposition module 258) to attempt to decompose the query into an INCURSOR predicate, which will be used as a driving clause, and other factors, which may be either local or INCURSOR factors, that can be evaluated through do_filesearch (in expression evaluation module 260). Then, next_filesearch scans records in the database one at a time using the VLA mechanism (incremental record request interface 262), testing each one using do_filesearch (in expression evaluation module 260). Note that if there is a driving clause, next_filesearch also acts as part of cursor processing subsystem 256, managing the incremental retrieval of values from the foreign cursor, and do_filesearch is used to evaluate a clause created by function setuprquery, where the clause specifies equality between fields in the record and values extracted from the foreign cursor.

Each time a record is found to satisfy the search predicate, next_filesearch immediately returns, making the record available to calling environment 251.

Expression Evaluation Module 260: This part of the system is contained in file FILESEARCH.C. The primary function for expression evaluation is do_filesearch. This function not only handles AND, OR and NOT combinations, but also dispatches the evaluation of other predicates to appropriate handlers. Any INCURSOR predicates are passed to validate_incursor (part of cursor processing subsystem 256) while comparison predicates are passed to evaluation function predsearch and other utility functions subordinate to predsearch, such as likesearch.

Predicate Decomposition Module 258: This part of the system is contained in file FILESEARCH.C. Predicate decomposition is accomplished solely by function process_incursor. Because the underlying database system (the VAX/VMS file system) does not provide any native searching capabilities, this gateway system does not use local factors. Thus, process_incursor simply attempts to factor a single INCURSOR predicate (to be used as a driving clause) from the query, and leaves the remaining portion of the query as INCURSOR factors. Note that these remaining factors are not required to contain an INCURSOR predicate. They are evaluated as a unit by do_filesearch, which makes appropriate calls to validate_incursor if an INCURSOR predicate is encountered.

Cursor Processing Subsystem 256: This part of the system is contained in file FILESEARCH.C. The function validate_incursor evaluates a single INCURSOR predicate using the validation mechanism. The function creates a tuple of values from the current database record and determines whether the tuple is one that could be produced by the foreign cursor. If so, the predicate is TRUE, otherwise FALSE.

A portion of the function next_filesearch, described above as an element of process control module 254, also belongs to cursor processing subsystem 256. This function is responsible for incrementally obtaining distinct tuples from the foreign cursor operand of an INCURSOR predicate (a driving clause from predicate decomposition module 258) if available. The distinctness of values extracted from the foreign cursor is provided by a "uniqueness wrapper" around the foreign cursor, as defined in the file UCURSOR.C and its supporting file BTREE.C.

Interface 252: The interface between calling environment 251 and the process control module 254 is the ISIS/Host Open Gateway. The interface is contained in files UCURSORMETHODS.C, UCURSORS.C, UDAO.C, UDAOMETHODS.C, UDBAOMETHODS.C, UFIELDPROPS.C, UFUNCTIONDECL.H, URLISTS.C, USAODATA.C, USAOMETHODS.C, USEGMENTCLASS.C, UUPDATECURSOR.C, UUSER.C, UUSER.H, UUSERDATA.H and UWRAPPERS.C. The portion of the interface that relates specifically to searching and the concomitant INCURSOR processing is in the routines user_opencursor and user_positioncursor in UUSER.C. A number of the other functions in UUSER.C are tailored to interact with the system described here, most notably user_opendb where the database file is opened, and user_getscdd where the data is read from file and placed in the VLA.

Calling Environment 251: The calling environment for this embodiment is the previously mentioned ISIS/Host multi-database system.

Conclusion

The foregoing description of the invention has been presented for purposes of illustration and description in conjunction with the Appendices attached hereto. The above description is not intended to be exhaustive or to limit the invention to the precise form disclosed, and many modifications and variations are possible in light of the teaching without deviating from the spirit and scope of the invention. The embodiment chosen and described is selected to best explain the principles of the invention and its practical application to thereby enable others skilled in the art to best utilize the invention in various embodiments and with various modifications as suited for the particular purpose contemplated. For example, a wide range of commercially available hardware and component substitutes can be used in lieu of those described above. It is intended that the scope of the invention be defined by the claims appended hereto.

List of Appendices

Appendix A—Microfiche of Source Code for Flat-File Gateway

What is claimed is:

1. A method for performing a multiple-segment search over a first database segment with a search predicate requiring values from a second database segment, where the first and the second databases are managed by a first and a second database management system, respectively, where the search predicate is a top-level AND conjunction of independent factors, and where the search predicate contains an INCURSOR operator, the method comprising the computer-implemented steps of:

(a) Dividing the top-level factors into incursor factors, being those that contain INCURSOR operators, and local factors, being those that do not contain INCURSOR operators, whereby the local factors contain no references to the second database segment; and (b) Iterating the following steps over those tuples produced by a search of the first database where all the local factors are satisfied:
  i. evaluating the INCURSOR predicates in the incursor factors;
  ii. then evaluating the incursor factors using the results of the foregoing step;
  iii. then, while the multiple-segment search is ongoing, if the result of the preceding step is TRUE, making the record from the first database segment available at that time as an incremental part of the result of the multiple-segment search.

2. The method recited in claim 1, wherein the first database management system is a relational database management system.

3. The method recited in claim 1, wherein the first database management system is a file management system.

4. The method recited in claim 1, wherein the first and the second database management systems are different from each other.

5. The method recited in claim 1, wherein the step (b)(i) of evaluating an INCURSOR predicate comprises the steps of:
  (a) Using the first (field list) operand of the INCURSOR predicate to create a second tuple of values from the tuple produced by the search of the first database; and
  (b) Validating the second tuple against the second (foreign search) operand of the INCURSOR predicate, whereby a value of TRUE or FALSE is yielded as the value of the INCURSOR predicate.

6. A method for performing a multiple-segment search over a first database segment with a search predicate requiring values from a second database segment, where the first and the second databases are managed by a first and a second database management system, respectively, where the search predicate is a top-level AND conjunction of independent factors, and where at least one of the top-level factors is an INCURSOR predicate, the method comprising the computer-implemented steps of:
  (a) Selecting a driving clause from among the top-level INCURSOR predicates;
  (b) Then dividing the remaining top-level factors into incursor factors, being those that contain INCURSOR operators, and local factors, being those that do not contain INCURSOR operators, whereby the local factors contain no references to the second database segment;
  (c) Then iterating the following steps over those tuples produced by a search of the second database segment using the driving clause:
    i. Passing on to the next iteration if the tuple from the driving clause contains any NULL values;
    ii. Otherwise, iterating the following steps over each record produced by a search of the first database segment using a filter predicate that conjoins the local factors with a predicate that is TRUE only if all the values in the tuple from the driving clause are equal to the values from the corresponding fields in the first database segment:
      A. evaluating the INCURSOR base predicates in the incursor factors;
      B. then evaluating the incursor factors using the results of the foregoing step; and
      C. then, while the multiple-segment search is ongoing, if the result of the preceding step is TRUE, making the record from the first database segment available at that time as an incremental part of the result of the multiple-segment search.

7. The method recited in claim 6, wherein the first database management system is a relational database management system.

8. The method recited in claim 6, wherein the first database management system is a file management system.

9. The method recited in claim 6, wherein the first and the second database management systems are different from each other.

10. The method recited in claim 6, wherein the steps (b)(i) of evaluating an INCURSOR predicate comprises the steps of:
  (a) Creating a second tuple of values from the tuple produced by the search of the first database to use as the first (field list) operand of the INCURSOR predicate; and
  (b) Validating the second tuple against the second (foreign search) operand of the INCURSOR predicate, whereby a value of TRUE or FALSE is yielded as the value of the INCURSOR predicate.

11. A method for performing a theta-join over a first and a second table managed by a first and a distinct second database management system to produce a select list of field expressions, with a filter predicate and with a set of linking fields between the first and the second table, the method comprising the computer-implemented steps of:
  (a) Reducing the filter predicate into a conjunctive form having a top-level conjunction of factors;
  (b) Dividing the top-level factors into first-table factors, being those that refer only to fields in the first table, second-table factors, being those that refer only to fields in the second table, and mixed factors, being those that refer to fields in the both the first and the second tables;
  (c) Invoking a query on the first table by the first database management system to retrieve incrementally records that satisfy the first-table factors, and for each record retrieved that has no NULL linking field, performing the following steps:
    i. If no linking field in the record is NULL, invoking a query on the second table by the second database management system to retrieve records that satisfy the second-table factors and that have linking field values related by the theta operator to the linking field values of the record retrieved from the first table;
    ii. For each record retrieved from the second table in the preceding step (i), evaluating the mixed factors against the current first table record and the second table record;
    iii. If the result of the evaluation of the preceding step (ii) is TRUE, calculating the values of the field expressions in the select list and producing the select list as a result of the present iteration.

12. The method recited in claim 11, wherein the step (a) of reducing the filter predicate further completes the reduction of the filter predicate to conjunctive normal form.

13. The method recited in claim 11, wherein the first table is a relation managed by a relational database management system.

14. The method recited in claim 11, wherein the steps of invoking a query on a table comprise the steps of:
  (a) Formulating a dynamic SQL statement that embodies the query; and
  (b) Invoking the dynamic SQL statement in the table's database management system.

15. The method recited in claim 11, wherein the step (c)(i) of invoking a query on the second table invokes the query so as to retrieve records incrementally.

16. A method for performing a theta-join over a first and a second table managed by a first and a distinct second database management system to produce a select list of field expressions, with a filter predicate, and with a set of linking fields between the first and the second table, the method comprising the computer-implemented steps of:

(a) Reducing the filter predicate to conjunctive normal form, whereby a top-level conjunction of factors is created;

(b) Dividing the top-level factors into first-table factors, being those that refer only to fields in the first table, second-table factors, being those that refer only to fields in the second table, and mixed factors, being those that refer to fields in the both the first and the second tables;

(c) Invoking a query on the first table by the first database management system to retrieve incrementally records that satisfy the first-table factors, and for each record retrieved that has no NULL linking field, performing the following steps:

i. Transforming the mixed factors into NULL-reduced mixed factors based on the values in the record retrieved from the first table, whereby all the consequences of any NULL values in the retrieved record are propagated through the mixed factors;

ii. Invoking a query on the second table by the second database management system to retrieve records that satisfy the second-table factors, that satisfy the NULL-reduced mixed factors, and that have linking field values related by the theta operator to the linking field values of the record retrieved from the first table;

iii. Then calculating the values of the field expressions in the select list and producing the select list as a result of the present iteration.

17. A gateway system for performing a multiple-operand search over a database for those records that satisfy a first search predicate that includes an INCURSOR predicate having a field list operand and a foreign cursor operand, where the database is managed by a database management system, the gateway system comprising:

(a) means for receiving the first search predicate;

(b) means for dividing the first search predicate into a conjunction of top-level factors;

(c) means for opening the database through the database management system;

(d) means for incrementally retrieving those records that satisfy the local factors (being those top-level factors that do not contain an INCURSOR operand at any level) from the database through the database management system;

(e) means for invoking the foreign cursor operand to validate a local tuple of values taken from a record retrieved from the database; and (f) means for incrementally producing records retrieved from the database while the multiple-operand search is ongoing as incremental parts of the result of the multiple-operand search.

18. The gateway system as recited in claim 17, wherein the field list identifies one or more fields in the database, further comprising:

(a) means for incrementally obtaining a distinct foreign tuple from the foreign cursor operand;

(b) means for forming a driving tuple having values taken from the distinct foreign tuple; and (c) means for incrementally retrieving through the database management system those records in the database that satisfy the local factors and that have values in the field list operand fields equal to corresponding values in the driving tuple.

19. The gateway system as recited in claim 17, further comprising:

(a) means for receiving a cursor, the cursor having a second search predicate to be performed over the database management system to validate a validation tuple of values;

(b) means for querying the database management system to determine whether the validation tuple appears in some record in the database; and (c) means for providing the result of the preceding querying step.

* * * * *

UNITED STATES PATENT AND TRADEMARK OFFICE
CERTIFICATE OF CORRECTION

PATENT NO. : 5,511,186

DATED : April 23, 1996

INVENTOR(S) : Carhart, et al.

It is certified that error appears in the above-identified patent and that said Letters Patent is hereby corrected as shown below:

Column 6, line 29: change "has-the" to --has the--.

Column 16, line 5: change "OR" to --OR--.

Column 16, lines 22-24: delete the phrase "and described in Appendix B -- ISIS™/Host Open Gateway Developer's Guide, both".

Column 16, line 24: change "included as appendices" to --included as an appendix--.

Column 19, line 20: change "VLAmecha-" to --VLA mecha---.

Column 19, line 37: change "OR" to --OR--.

Column 22, line 11: change "steps" to --step--.

Column 22, line 11: change "(b)(i)" to --(c)(ii)(A)--.

Signed and Sealed this

Twenty-fourth Day of September, 1996

Attest:

BRUCE LEHMAN

*Attesting Officer*  *Commissioner of Patents and Trademarks*